(12) United States Patent
Kang

(10) Patent No.: US 12,191,083 B2
(45) Date of Patent: Jan. 7, 2025

(54) MULTILAYER ELECTRONIC COMPONENT

(71) Applicant: SAMSUNG ELECTRO-MECHANICS CO., LTD., Suwon-si (KR)

(72) Inventor: Su Ji Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 244 days.

(21) Appl. No.: 17/989,176

(22) Filed: Nov. 17, 2022

(65) Prior Publication Data

US 2023/0197341 A1 Jun. 22, 2023

(30) Foreign Application Priority Data

Dec. 21, 2021 (KR) .................. 10-2021-0184078

(51) Int. Cl.
*H01G 4/224* (2006.01)
*H01G 4/005* (2006.01)
*H01G 4/30* (2006.01)

(52) U.S. Cl.
CPC ............ *H01G 4/224* (2013.01); *H01G 4/005* (2013.01); *H01G 4/30* (2013.01)

(58) Field of Classification Search
CPC .......... H01G 4/224; H01G 4/005; H01G 4/30; H01G 4/32
See application file for complete search history.

(56) References Cited

U.S. PATENT DOCUMENTS

| 2016/0217924 A1* | 7/2016 | Morita ............... C04B 35/4682 |
| 2017/0040111 A1 | 2/2017 | Kim et al. | |
| 2019/0027311 A1* | 1/2019 | Chigira ............... H01G 4/1227 |
| 2019/0385794 A1* | 12/2019 | Yanagisawa ......... H01G 4/1245 |
| 2020/0066452 A1 | 2/2020 | Cha et al. | |
| 2021/0183582 A1* | 6/2021 | Chigira ................ H01L 28/55 |
| 2023/0128407 A1* | 4/2023 | Masuda .............. H01G 4/0085 |
| | | | 361/301.4 |

FOREIGN PATENT DOCUMENTS

| KR | 10-1701049 B1 | 1/2017 |
| KR | 10-2019-0121153 A | 10/2019 |

OTHER PUBLICATIONS

H. Alves et al., "Aqueous Corrosion of Nickel and its Alloys", Reference Module in Materials Science and Materials Engineering (2016), pp. 1879-1915.

* cited by examiner

*Primary Examiner* — Michael P McFadden
(74) *Attorney, Agent, or Firm* — MORGAN, LEWIS & BOCKIUS LLP

(57) ABSTRACT

A multilayer electronic component includes a body including a plurality of dielectric layers, a side margin portion disposed on the body, and external electrodes disposed on the body. The body includes an active portion having internal electrodes alternately arranged with the dielectric layer interposed therebetween in the first direction and a cover portion disposed on both end surfaces of the active portion in a first direction, the active portion. The cover portion, and the side margin portion include molybdenum (Mo). A Mo content in an interfacial portion, a region of the active portion, adjacent to one of the cover portion or the side margin portion, is higher than a Mo content in a central portion of the active portion. A Mo content in the one of the cover portion and the side margin portion is higher than the Mo content in the interfacial portion.

22 Claims, 14 Drawing Sheets

MULTILAYER ELECTRONIC COMPONENT

CROSS-REFERENCE TO RELATED APPLICATION(S)

This application claims benefit of priority to Korean Patent Application No. 10-2021-0184078 filed on Dec. 21, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like, to allow electricity to be charged therein and discharged therefrom.

Such an MLCC having advantages such as compactness, guaranteed high capacitance, and ease in mounting thereof may be used as components of various electronic devices. As various electronic devices such as computers, mobile devices, and the like, have become smaller and higher in terms of power output, demand for miniaturization and higher capacitance of multilayer ceramic capacitors has increased.

In addition, as industry interest in electric parts for automobiles has recently increased, MLCCs are also required to have high reliability and high strength characteristics in order to be used in automobile or infotainment systems. Accordingly, the trend of a rapid increase in the penetration rate of electric vehicles is expected to continue, and in line with this, parts of electric vehicles and autonomous vehicles are required to have higher performance and reduced weights.

In particular, in order to miniaturize and increase capacitance of MLCCs, it is required to maximize an effective region of electrodes (increase in the effective volume fraction required for capacitance implementation).

In order to realize compact, high capacitance MLCCs as described above, in manufacturing MLCCs, a method of exposing internal electrodes in a width direction of a body to maximize a width directional area of the internal electrodes through a margin-free design and attaching a separate side margin portion to an exposed width-directional electrode surface of a chip before performing sintering after the chip is manufactured for completion is applied.

However, the capacitance per unit volume of capacitors may be improved by separately attaching the side margin portion, but there is a problem in that reliability may be deteriorated due to a decrease in the thickness of the side margin portion.

In addition, in general, moisture may enter through a gap between the outermost internal electrode and a cover portion in a stacking direction to cause deterioration of the characteristics of the multilayer electronic components, and when destructive analysis of defective products was conducted after moisture resistance evaluation, an incidence rate of burnt defects tended to be high in the cover portions.

SUMMARY

Exemplary embodiments provide a multilayer electronic component having improved moisture resistance reliability.

Exemplary embodiments provide a reliable, compact, high capacitance multilayer electronic component.

According to an aspect of the present disclosure, a multilayer electronic component includes: a body including a plurality of dielectric layers and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a side margin portion disposed on fifth and sixth surfaces; and external electrodes disposed on the third and fourth surfaces. The body includes an active portion having internal electrodes alternately arranged with the dielectric layer interposed therebetween in the first direction and a cover portion disposed on both end surfaces of the active portion in the first direction. The active portion, the cover portion, and the side margin portion include molybdenum (Mo). A Mo content in an interfacial portion, a region of the active portion, adjacent to one of the cover portion and the side margin portion, is higher than a Mo content in a central portion of the active portion. A Mo content in the one of the cover portion and the side margin portion is higher than the Mo content in the interfacial portion.

According to another aspect of the present disclosure, a multilayer electronic component includes: a body including a plurality of dielectric layers and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a side margin portion disposed on fifth and sixth surfaces; and external electrodes disposed on the third and fourth surfaces. The body includes an active portion having internal electrodes alternately arranged with the dielectric layer interposed therebetween in the first direction and a cover portion disposed on both end surfaces of the active portion in the first direction. In the active portion, a molybdenum (Mo) content decreases in an inward direction towards a center portion of the active portion.

According to another aspect of the present disclosure, a multilayer electronic component includes: a body including a plurality of dielectric layers and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on the third and fourth surfaces. The body includes an active portion having internal electrodes alternately arranged with the dielectric layer interposed therebetween in the first direction and a cover portion disposed on both end surfaces of the active portion in the first direction. A molybdenum (Mo) content in the cover portion is greater than a Mo content in the active portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
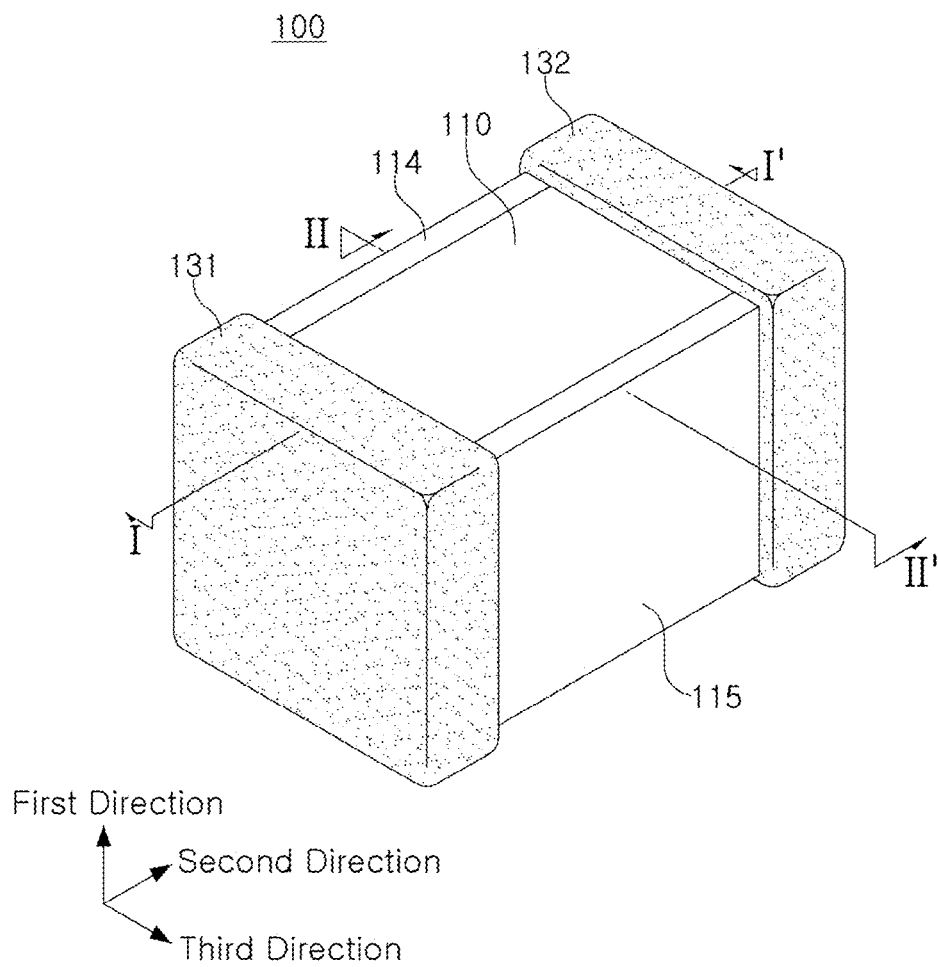
FIG. 1 is a schematic perspective view of a multilayer electronic component according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements.

In the drawings, a first direction may be defined as a stacking direction or a thickness (T) direction, a second direction may be defined as a length (L) direction, and a third direction may be defined as a width (W) direction.

Multilayer Electronic Component

FIG. 1 is a schematic perspective view of a multilayer electronic component according to an exemplary embodiment in the present disclosure.

Figure 2:
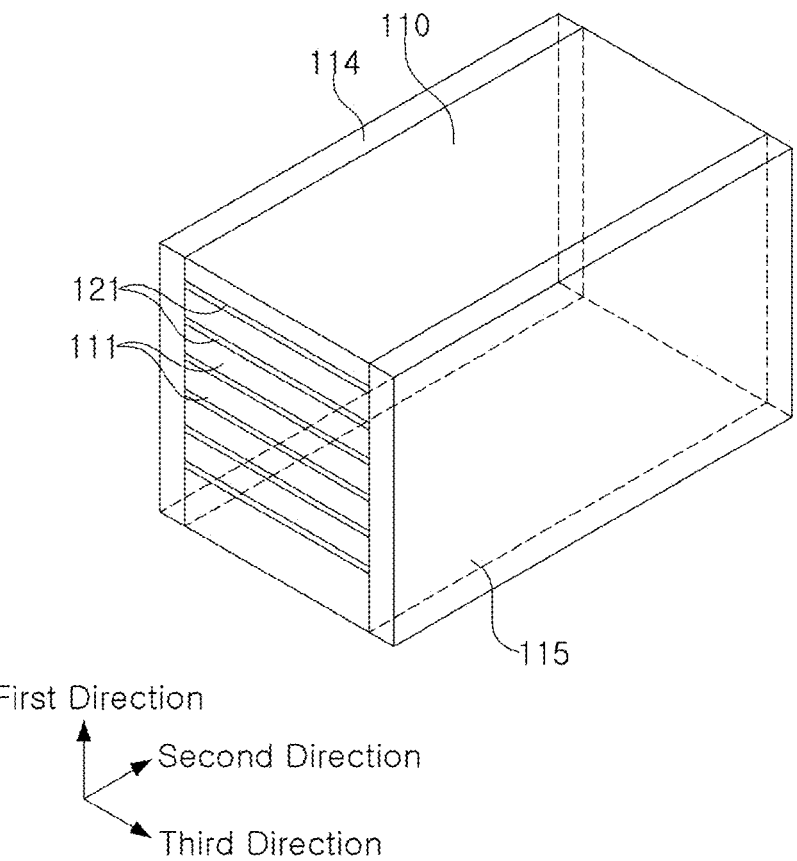
FIG. 2 is a perspective view of the multilayer electronic component of FIG. 1, except for external electrodes.

FIG. 2 is a perspective view of the multilayer electronic component of FIG. 1, except for external electrodes.

Figure 3:
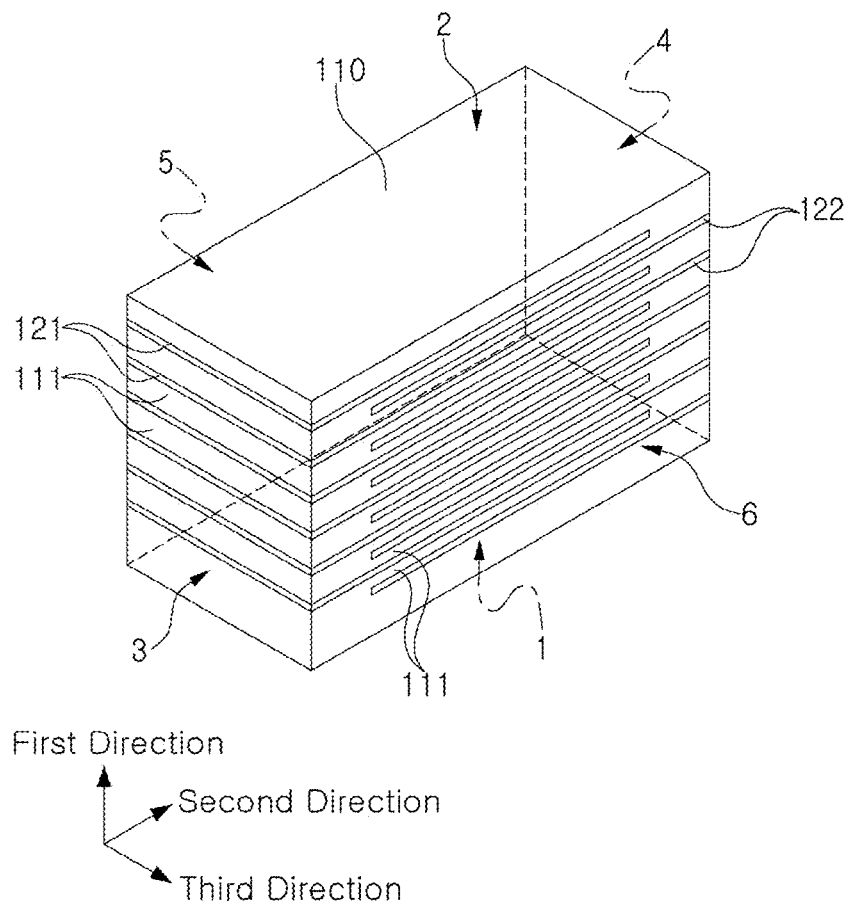
FIG. 3 is a perspective view illustrating the multilayer electronic component of FIG. 1, except for external electrodes and a side margin portion.

FIG. 3 is a perspective view illustrating the multilayer electronic component of FIG. 1, except for external electrodes and a side margin portion.

Figure 4:
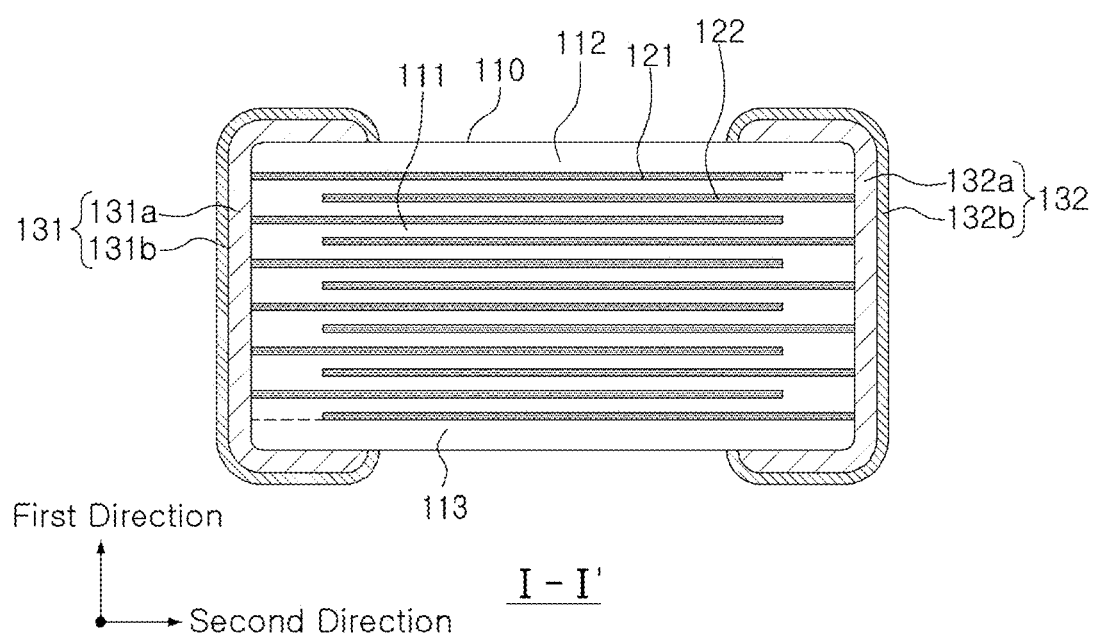
FIG. 4 is a cross-sectional view taken along line I-I' of FIG. 1.

FIG. 4 is a cross-sectional view taken along line I-I' of FIG. 1.

Figure 5:
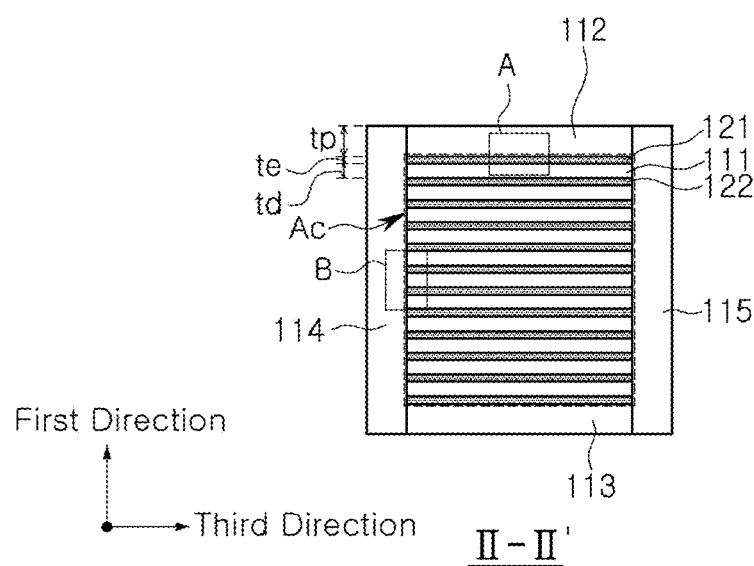
FIG. 5 is a cross-sectional view taken along line II-II' of FIG. 1.

FIG. 5 is a cross-sectional view taken along line II-II' of FIG. 1.

Figure 6:
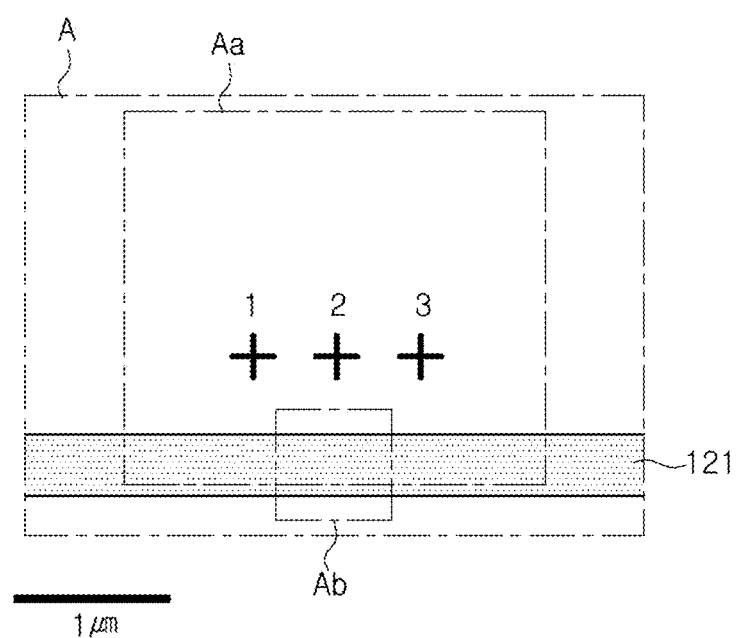
FIG. 6 is an enlarged view of region (A) of FIG. 5.

FIG. 6 is an enlarged view of region (A) of FIG. 5.

Hereinafter, a multilayer electronic component according to an exemplary embodiment in the present disclosure will be described in detail with reference to FIGS. 1 to 6.

A multilayer electronic component 100 according to an exemplary embodiment in the present disclosure includes a body 110 including a plurality of dielectric layers 111 and including first and second surfaces opposing each other in a first direction, third and fourth surfaces connected to the first and second surfaces and opposing each other in a second direction, and fifth and sixth surfaces connected to the first to fourth surfaces and opposing each other in a third direction; side margin portions 114 and 115 disposed on fifth and sixth surfaces; and external electrodes 131 and 132 disposed on the third and fourth surfaces. The body 110 includes an active portion having internal electrodes 121 and 122 alternately arranged with the dielectric layer 111 therebetween in the first direction and cover portions 112 and 113 disposed on both end surfaces of the active portion in the first direction, the active portion, the cover portions 112 and 113, and the side margin portions 114 and 115 include molybdenum (Mo), the content of Mo in an interfacial portion, a region adjacent to the cover portions 112 and 113 and the side margin portions 114 and 115 in the active portion is higher than the content of Mo in a central portion of the active portion, and the Mo content in the cover portions 112 and 113 and the side margin portions 114 and 115 is higher than the Mo content in the interfacial portion.

In the body 110, the dielectric layer 111 and the internal electrodes 121 and 122 are alternately stacked.

A specific shape of the body 110 is not limited, although, as illustrated, the body 110 may have a hexahedral or similar shape. Due to shrinkage of ceramic powder particle included in the body 110 during firing, the body 110 may not have a hexahedral shape with perfect straight lines but may have a substantially hexahedral shape.

The body 110 may have the first and second surfaces opposing each other in the first direction, the third and fourth surfaces connected to the first and second surfaces and opposing each other in the second direction, and the fifth to sixth surfaces connected to the first to fourth surfaces and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, binders, dispersants, and the like may be added to powder such as barium titanate ($BaTiO_3$) according to the purpose of the present disclosure. For example, the dielectric layer 111 may be formed by applying and drying a slurry formed to include powder such as barium titanate ($BaTiO_3$) on a carrier film to prepare a plurality of ceramic sheets. The ceramic sheet may be formed by preparing a slurry by mixing ceramic powder, a binder, and a solvent and preparing the slurry in a sheet shape having a thickness of several μm by a doctor blade method, but is not limited thereto.

Meanwhile, a thickness td of the dielectric layer 111 is not particularly limited. However, in order to more easily achieve miniaturization and high capacitance of the multilayer electronic component 100, a thickness td of the dielectric layer 111 may be 0.4 μm or less. Here, the thickness td of the dielectric layer 111 may refer to an average thickness of the dielectric layer 111.

The average thickness of the dielectric layer 111 may be measured by scanning an image of a cross-section of the body 110 in the length-thickness (L-T) direction with a scanning electron microscope (SEM) having a magnification of 10,000. More specifically, the average value may be measured by measuring the thickness of one dielectric layer at 30 equally spaced points in the longitudinal direction in the scanned image. The 30 points at equal intervals may be designated in the active portion Ac. In addition, if the average value is measured by extending the measurement of the average value to 10 dielectric layers, the average thickness of the dielectric layers may be more generalized.

The body 110 may include the active portion Ac formed inside the body 110 and forming capacitance with the first internal electrode 121 and the second internal electrode 122 disposed to face each other with the dielectric layer 111 interposed therebetween and cover portions 112 and 113 formed above and below the active portion Ac in the first direction. That is, the cover portions 112 and 113 may be disposed on both end surfaces of the active portion Ac in the first direction.

The active portion Ac is a portion contributing to the formation of capacitance of the capacitor, and may be formed by repeatedly stacking a plurality of first and second internal electrodes with the dielectric layer 111 interposed therebetween.

The cover portions 112 and 113 may be formed by stacking a single dielectric layer 111 or two or more dielectric layers 111 on the upper and lower surfaces of the active portion Ac in the first direction, respectively, and may basically serve to prevent damage to the internal electrodes 121 and 122 due to physical or chemical stress.

The cover portions 112 and 113 do not include the internal electrodes 121 and 122 and may include the same material as that of the dielectric layer 111. That is, the cover portions 112 and 113 may include a ceramic material, for example, a barium titanate ($BaTiO_3$)-based ceramic material.

Meanwhile, a thickness tp of the cover portions 112 and 113 is not particularly limited. However, in order to more easily achieve miniaturization and high capacitance of the multilayer electronic component 100 and increase the capacitance per unit volume, the thickness tp of the cover portions 112 and 113 may be 20 μm or less.

The average thickness tp of the cover portions 112 and 113 may refer to a size in the first direction, and may be a value obtained by averaging sizes of the cover portions 112 and 113 measured at five equally spaced points above or below the active portion Ac.

In addition, side margin portions 114 and 115 may be disposed on both end surfaces of the active portion Ac in the third direction.

The side margin portions 114 and 115 may include a first side margin portion 114 disposed on the fifth surface of the body 110 and a second side margin portion 115 disposed on the sixth surface of the body 110.

In addition, in order to suppress a step difference due to the internal electrodes 121 and 122, the side margin portions 114 and 115 may be formed by cutting the internal electrodes to be exposed to the fifth and sixth surfaces 5 and 6 of the body after stacking and subsequently stacking a single dielectric layer or two or more dielectric layers on both end surfaces of the active portion Ac in the third direction, and basically, the side margin portions 114 and 115 may serve to prevent damage to the internal electrodes 121 and 122 due to physical or chemical stress.

The side margin portions 114 and 115 may not include the internal electrodes 121 and 122 and may include the same material as that of the dielectric layer 111. That is, the side margin portions 114 and 115 may include a ceramic material, for example, a barium titanate ($BaTiO_3$)-based ceramic material.

Meanwhile, a width of the side margin portions 114 and 115 is not particularly limited. However, an average width of the side margin portions 114 and 115 may be 20 μm or less in order to more easily achieve miniaturization and high capacitance of the multilayer electronic component and increase the capacitance per unit volume.

The width of the side margin portions 114 and 115 may refer to a size in the first direction, and may be a value obtained by averaging sizes of the side margin portions 114 and 115 measured at five equally spaced points above or below the active portion Ac.

The internal electrodes 121 and 122 may be alternately disposed with the dielectric layer 111 interposed therebetween.

Also, the internal electrodes 121 and 122 may include first and second internal electrodes. The first and second internal electrodes are alternately disposed to face each other with the dielectric layer 111 constituting the active portion Ac therebetween, and are respectively exposed to the third and fourth surfaces of the body 110 in the second direction.

Referring to FIG. 3, the first internal electrode 121 may be spaced apart from the fourth surface and exposed through (or extending from or in contact with) the third surface, and the second internal electrode 122 may be spaced apart from the third surface and exposed through (or extending from or in contact with) the fourth surface. Also, the first internal electrode 121 may be exposed through (or extending from or in contact with) the third, fifth, and sixth surfaces, and the second internal electrode 122 may be exposed through (or extending from or in contact with) the fourth, fifth, and sixth surfaces. In this case, the first and second internal electrodes may be electrically separated from each other by the dielectric layer 111 disposed therebetween.

The internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Meanwhile, a thickness te of the internal electrodes 121 and 122 is not particularly limited. However, in order to more easily achieve miniaturization and high capacitance of the multilayer electronic component 100, the thickness te of the internal electrodes 121 and 122 may be 0.4 μm or less. Here, the thickness te of the internal electrodes 121 and 122 may refer to an average thickness of the internal electrodes 121 and 122.

The average thickness of the dielectric layer 111 may be measured by scanning an image of a cross-section of the body 110 in the length-thickness (L-T) direction with a scanning electron microscope (SEM) having a magnification of 10,000. More specifically, the average value may be measured by measuring the thickness of one dielectric layer at 30 equally spaced points in the longitudinal direction in the scanned image. The 30 points at equal intervals may be designated in the active portion Ac. In addition, if the average value is measured by extending the measurement of the average value to 10 dielectric layers, the average thickness of the dielectric layers may be more generalized.

In order to realize compact, high capacitance multilayer ceramic capacitor, in manufacturing the multilayer ceramic capacitor, a method of exposing the internal electrodes 121 and 122 in the third direction of the body 110 to maximize a third directional area of the internal electrodes 121 and 122 through a margin-free design and attaching separate side margin portions 114 and 115 to an exposed third-directional electrode surface of a chip before performing sintering after the chip is manufactured for completion is applied. However, the capacitance per unit volume of the capacitor may be improved by separately attaching the side margin portions 114 and 115, but reliability may be degraded due to the design such as reducing the thickness of the side margin portions 114 and 115.

In addition, moisture may enter through a gap between the outermost internal electrode and the cover portions 112 and 113 in the stacking direction to cause deterioration of characteristics of the multilayer ceramic capacitor. Accordingly, when destructive analysis of defective products was conducted after the moisture resistance evaluation, there was a tendency that the incidence rate of defects due to the burnt phenomenon was high in the cover portions 112 and 113.

The burnt phenomenon refers to a small hole that is generated by burning black when electrical energy is converted into thermal energy in the internal electrode region due to a difference in material or thermal properties between adjacent internal electrodes and dielectric layers.

In order to solve this problem, there have been attempts to improve reliability by adding Mo to the internal electrodes 121 and 122, but when Mo is added to the conductive paste for the internal electrodes 121 and 122, it is necessary to change the existing sintering conditions and there is a problem in that it is very difficult to control a sintering behavior and dielectric properties due to Mo diffused into the dielectric layer 111.

In an exemplary embodiment in the present disclosure, the active portion Ac, the cover portions 112 and 113, and the side margin portions 114 and 115 may include Mo. In particular, the Mo content in the interfacial portion may be higher than the Mo content in the central portion of the active portion Ac, and the Mo content in the cover portions 112 and 113 and the side margin portions 114 and 115 may be higher than the Mo content in the interfacial portion. In this case, as for the interfacial portion, regions adjacent to the cover portions 112 and 113 may be defined as first and third interfacial portions, and regions adjacent to the side margin portions 114 and 115 may be defined as second and fourth interfacial portions.

More specifically, by adding Mo at a higher concentration than the interfacial portion to the cover portions 112 and 113 and the side margin portions 114 and 115, Mo may be diffused into the internal electrode or dielectric within the adjacent active portion Ac during a sintering process, thereby improving the moisture resistance reliability by improving corrosion resistance of a portion vulnerable to the moisture resistance defect of the active portion without having to significantly change the design and sintering conditions of the conventional active portion.

In general, a Ni—Mo alloy is widely known as an alloy having excellent corrosion resistance, and when the Ni—Mo alloy internal electrodes 121 and 122 are applied, the degree of corrosion may be sharply reduced according to the degree of an increase in a certain content of Mo. Accordingly, there is a great effect in improving defects caused by Ni corrosion as a result of the penetration of a plating solution during a plating process, and improved characteristics may be exhibited even in high temperature, high humidity reliability evaluation.

That is, in the active portion Ac, the interfacial portion including Mo while being adjacent to the cover portions 112 and 113 and the side margin portions 114 and 115 may increase a Schottky barrier in the interfaces of the interfacial portion, the cover portions 112 and 113, and the side margin portions 114 and 115, serving to improve a high-temperature load lifespan and moisture-resistance reliability.

The Schottky barrier is a potential barrier (energy barrier) generated when a metal and a semiconductor are brought into contact. When a metal and a semiconductor are brought into contact, carriers move so that the Fermi levels of the two objects match and a space charge layer is formed on a surface of the semiconductor to form a potential barrier. Similar to a case in which a metal and a semiconductor are brought into contact, when a dielectric and the internal electrode come into contact, a Schottky barrier is also generated between the dielectric and the internal electrode surface, thereby achieving a space charge effect to improve the dielectric constant.

In addition, hydrogen generated during the plating process for forming the plating layers 131b and 132b of the external electrodes 131 and 132 may be diffused to the dielectric layer 111 through the internal electrodes 121 and 122, which may reduce reliability. However, according to an exemplary embodiment in the present disclosure, Mo included in the interfacial portion of the internal active portion Ac may adsorb hydrogen to suppress diffusion of hydrogen to the dielectric layer 111 through the internal electrodes 121 and 122. Accordingly, a decrease in reliability due to hydrogen diffusion may be suppressed.

In summary, after the Mo element is included in the cover portions 112 and 113 and the side margin portions 114 and 115, a sintering process may be performed so that Mo in the cover portions 112 and 113 and the side margin portions 114 and 115 may be partially reduced and diffused into the interfacial portion, which is the adjacent active portion Ac, to selectively form an alloy. Corrosion resistance may be selectively improved at the outermost internal electrode of the active portion Ac and an end portion of the internal electrode in the active portion Ac adjacent to the side margin portions 114 and 115, into which moisture may be relatively easily penetrates, thereby improving moisture resistance reliability characteristics. That is, as a concentration gradient is formed between the interfacial portion having a relatively low Mo content and the cover portions 112 and 113 and the side margin portions 114 and 115 having a relatively high Mo content, Mo may be diffused from the cover portions 112 and 113 and the side margin portions 114 and 115 toward the interfacial portion to improve the moisture resistance reliability of a final product.

In an exemplary embodiment, the central portion of the active portion Ac may not include Mo.

More specifically, during the sintering process, Mo included in the cover portions 112 and 113 and the side margin portions 114 and 115 may be diffused to the interfacial portion due to the concentration gradient, but Mo may not be diffused from the interfacial portion to the central portion.

In an exemplary embodiment, the content of Mo included in the cover portions 112 and 113 and the side margin portions 114 and 115 may be 0.1 at % or more and 5.5 at % or less, compared to the cover portions 112 and 113, and side margin portions 114 and 115, respectively.

If the content of Mo included in the cover portions 112 and 113 and the side margin portions 114 and 115 is less than 0.1 at %, Mo may not be sufficiently diffused to the interfacial portion, so the effect of improving moisture resistance reliability, such as corrosion resistance, expected by the addition of Mo may be insufficient, and if the content of Mo exceeds 5.5 at %, Mo is excessively diffused to the active portion Ac and it may be difficult to control the sintering behavior. In addition, at the initial stage of the sintering process, a difference between the Mo content of the cover portions 112 and 113 and the side margin portions 114 and 115 and the Mo content of the active portion Ac is too large, so that a difference between the sintering behavior of the cover portions 112 and 113 and the side margin portions 114 and 115 and the sintering behavior of the active portion Ac excessively increases to cause cracks or delamination due to mismatch of the sintering behavior, thereby degrading moisture resistance reliability.

The sintering behavior is greatly affected by a particle size of powder. In general, as the particle size of powder used for sintering decreases, a specific surface area may increase to lower a sintering temperature, and as the particle size of powder increases, the specific surface area may decrease to cause a phenomenon in that the sintering temperature increases. Accordingly, when the particle size is miniaturized, a sintered material product may be manufactured by a low-temperature, low-energy process during sintering of the same material, which is advantageous for sintering.

In contrast, when dissimilar materials with different sintering behaviors, for example, metals and ceramics are alternately laminated and sintered, a difference in sintering shrinkage behavior may be amplified as the particle size of the powder in use decreases, resulting in the occurrence of discontinuous layers or an acceleration of delamination.

In an exemplary embodiment, the Mo content included in the interfacial portion may be 0.05 at % or more and 1.0 at % or less.

Similarly, if the Mo content included in the interfacial portion is less than 0.05 at %, Mo may not be sufficiently diffused from the cover portions 112 and 113 and the side margin portions 114 and 115 in the direction of the interfacial portion during the sintering process, so that the effect of improving moisture resistance reliability, such as sufficient corrosion resistance, expected by the addition of Mo may be insufficient. If the Mo content included in the interfacial portion exceeds 5.5 at %, Mo may be excessively diffused in the active portion Ac and it may be difficult to control the sintering behavior. In addition, at the initial stage of the sintering process, a difference between the Mo content of the cover portions 112 and 113 and the side margin portions 114 and 115 and the Mo content of the active portion Ac is too large, so that a difference between the sintering behavior of the cover portions 112 and 113 and the side margin portions 114 and 115 and the sintering behavior of the active portion Ac excessively increases to cause cracks or delamination due to mismatch of the sintering behavior, thereby degrading moisture resistance reliability.

In an exemplary embodiment, the content of Mo included in the region spaced apart from the interfacial portion by 500 nm in an outward direction of the cover portions 112 and 113 and the margin portions may be 0.1 at % or more and 5.5 at % or less.

Figure 7A:
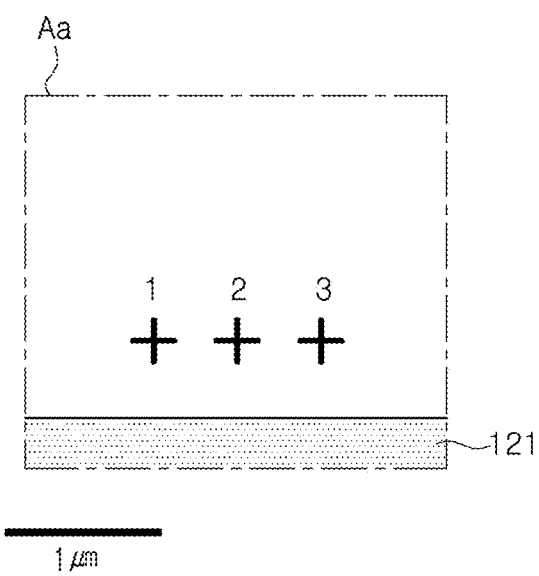
FIG. 7A is an enlarged view of region (Aa) of FIG. 6.
Figure 8A:
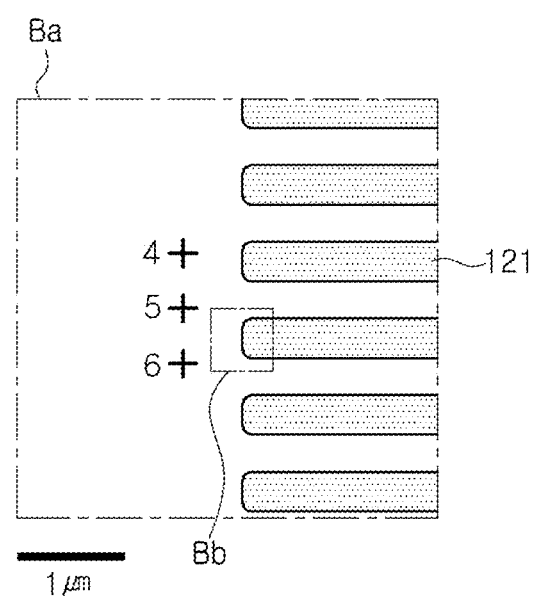
FIG. 8A is an enlarged view of region (Ba), which is a portion of the region (B) of FIG. 5.

Referring to FIG. 7A or FIG. 8A, the content of Mo included in a region spaced apart by 500 nm from the interfacial portion in the outward direction of the cover portions 112 and 113 (corresponding to 1, 2, and 3 in FIG. 7A) and a region spaced apart by 500 nm from the interfacial portion in an outward direction of the margin portions 114 and 115 (corresponding to 4, 5, and 6 of FIG. 8A) may be 0.1 at % or more and 5.5 at % or less.

This means that the moisture resistance reliability in the interfaces among the interfacial portion, the cover portion, and the side margin portion because Mo is included in the range of 0.1 at % or more and 5.5 at % or less in the cover portions 112 and 113 and the side margin portions 114 and 115 of the region adjacent to the interfacial portion.

In an exemplary embodiment, the content of Mo included in the region spaced apart by 20 nm from the cover portions 112 and 113 and the side margin portions 114 and 115 in an inward direction of the interface may be 0.05 at % or more and 1.0 at % or less.

Figure 9A:
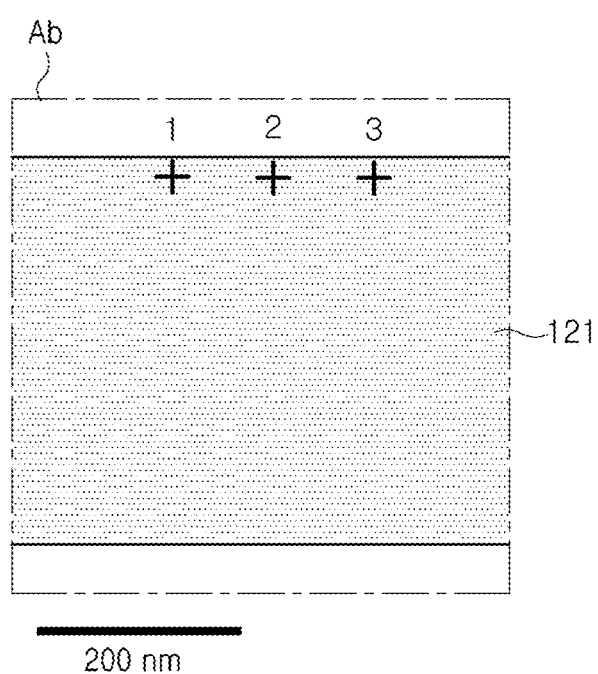
FIG. 9A is an enlarged view of region (Ab) of FIG. 6.
Figure 10A:
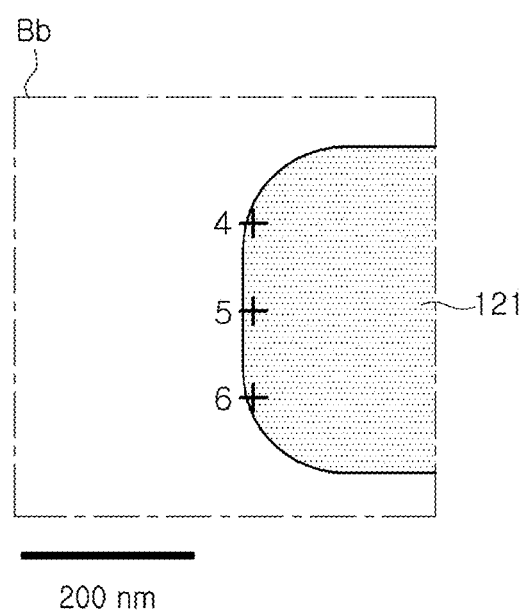
FIG. 10A is an enlarged view of region (Bb) of FIG. 9A.

Referring to FIG. 9A or 10A, the content of Mo included in the outermost internal electrode that is a region spaced apart from the cover portions 112 and 113 by 20 nm in an inward direction of the interfacial portion (corresponding to 1, 2, and 3 of FIG. 9A) and included at the end of the internal electrode 121 that is a region spaced apart from the side margin portions 114 and 115 by 20 nm in an inward direction of the interfacial portion (corresponding to 4, 5, and 6 of FIG. 10A) may be 0.05 at % or more and 1.0 at % or less.

This may mean that Mo was diffused to the interfacial portion from the cover portions 112 and 113 and the side margin portions 114 and 115 due to a concentration gradient during a sintering process because the content of Mo included in the cover portions 112 and 113 and the side margin portions 114 and 115 is relatively higher than the content of Mo included in the interfacial portion. The diffusion of Mo means that moisture resistance reliability is improved between the cover portions 112 and 113 and the side margin portions 114 and 115 and the interfacial portion.

The external electrodes 131 and 132 are disposed on the third and fourth surfaces of the body 110. The external electrodes 131 and 132 may include first and second external electrodes respectively disposed on the third and fourth surfaces of the body 110 and connected to the first and second internal electrodes.

Referring to FIG. 1, the external electrodes 131 and 132 may be disposed to cover both end surfaces of the side margin portions 114 and 115 in the second direction. In the present exemplary embodiment, a structure in which the multilayer electronic component 100 has two external electrodes 131 and 132 is described. However, the number and shape of the external electrodes 131 and 132 may be changed according to the shape of the internal electrodes 121 and 122 or for other purposes.

The external electrodes 131 and 132 may include a first external electrode 131 disposed on the third surface of the body 110 and a second external electrode 132 disposed on the fourth surface of the body 110, the internal electrodes 121 and 122 may include a first internal electrode 121 in contact with the first external electrode 131 and a second internal electrode 122 in contact with the second external electrode 132, and both ends of the first and second internal electrodes in the third direction may contact the side margin portions 114 and 115.

Meanwhile, the external electrodes 131 and 132 may be formed using any material having electrical conductivity, such as metal, and specific materials may be determined in consideration of electrical characteristics, structural stability, etc., and the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a. As a more specific example of the electrode layers 131a and 132a, the electrode layers 131a and 132a may be sintered electrodes including conductive metal and glass, or resin-based electrodes including conductive metal and resin.

In addition, the electrode layers 131a and 132a may be in a form in which a sintered electrode and a resin-based electrode are sequentially formed on the body 110. In addition, the electrode layers 131a and 132a may be formed by transferring a sheet including a conductive metal onto the body 110 or by transferring a sheet including a conductive metal onto the sintered electrode.

As the conductive metal included in the electrode layers 131a and 132a, a material having excellent electrical conductivity may be used and is not particularly limited. For example, the conductive metal may be one or more of nickel (Ni), copper (Cu), and alloys thereof.

The plating layers 131b and 132b serve to improve mounting characteristics. The plating layers 131b and 132b may be formed by sputtering or electrolytic plating, but are not particularly limited thereto.

The types of the plating layers 131b and 132b are not particularly limited, and may be plating layers 131b and 132b including one or more of nickel (Ni), copper (Cu), tin (Sn), palladium (Pd), platinum (Pt), gold (Au), silver (Ag), lead (Pb), and alloys thereof, and a plurality of layers may be formed. As a more specific example of the plating layers 131b and 132b, the plating layers 131b and 132b may be a Ni or Sn plating layer, may be in a form in which a Ni plating layer and a Sn plating layer are sequentially formed on the electrode layers 131a and 132a, or may be in a form in which the Sn plating layer, the Ni plating layer, and a Pd plating layer are sequentially formed. In addition, the plating layers 131b and 132b may include a plurality of Ni plating layers and/or a plurality of Sn plating layers. By including the plating layers 131b and 132b, mountability with a substrate, structural reliability, external durability, heat resistance, and/or equivalent series resistance (ESR) may be improved.

The size of the multilayer electronic component 100 is not particularly limited.

However, in order to achieve miniaturization and high capacitance at the same time, the number of stacks has to be increased by reducing the thickness of the dielectric layer 111 and the internal electrodes 121 and 122, and thus, the reliability improvement effect according to the present disclosure may be more remarkable in a multilayer electronic component 100 having a size of 1005 (length×width, 1.0 mm×0.5 mm) or less.

Hereinafter, the present disclosure will be described in more detail through experimental examples, which are intended to help specific understanding of the present disclosure, and the scope of the present disclosure is not limited by the experimental examples.

Experimental Example

A conductive paste for internal electrodes was applied on an active ceramic green sheet, stacked in the first direction, cut into a chip unit to prepare a body, and a ceramic green sheet for side margin portions was stacked on both end surfaces of the body in the third direction and sintered, and thereafter, external electrodes were formed to prepare a sample chip. At this time, sample chips were prepared by varying the Mo content included in the ceramic green sheet forming the cover portion and the margin portion.

For Experimental Examples 1 to 6, average Mo (at %) in the cover portion and the side margin portion and average Mo (at %) in the interfacial portion were measured, and the moisture resistance reliability was evaluated and shown in Table 3 below.

After the sample chip was polished to ½ in the L direction with respect to the WT surface, the Mo content at a certain point in each of the interfacial portion, cover portion, and side margin portion of the exposed cross-section was analyzed by transmission electron microscope-energy dispersive X-ray spectroscopy (TEM-EDS).

First, the Mo (at %) contents at the measurement positions 1 to 6 in the cover portion and the side margin portion of Experimental Example 4 was analyzed.

Figure 7B:
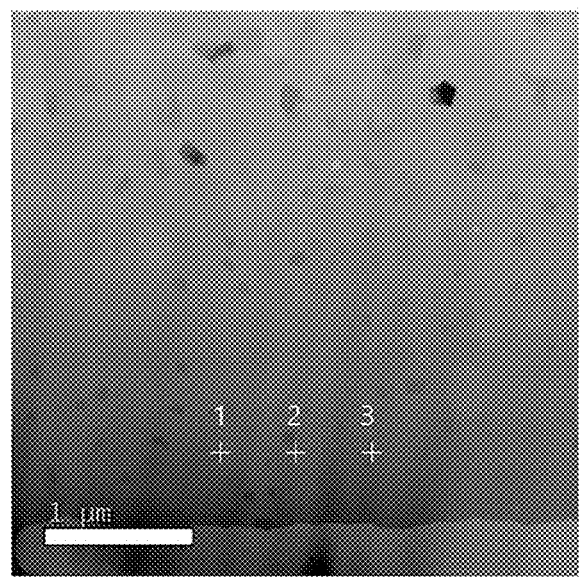
FIG. 7B is a TEM image of a corresponding sample region.

Referring to FIG. 7B, after the outermost internal electrode of the interfacial portion adjacent to the cover portion was aligned with the vertical midline of the image, the Mo content of the cover portion at points of measurement positions 1 to 3 (corresponding to 1, 2, and 3 of FIG. 7B) at equal intervals of 500 nm horizontally in a region of 500 nm in an outward direction of the cover portion from the interface between the cover portion and the outermost internal electrode of the interfacial portion was analyzed.

Figure 8B:
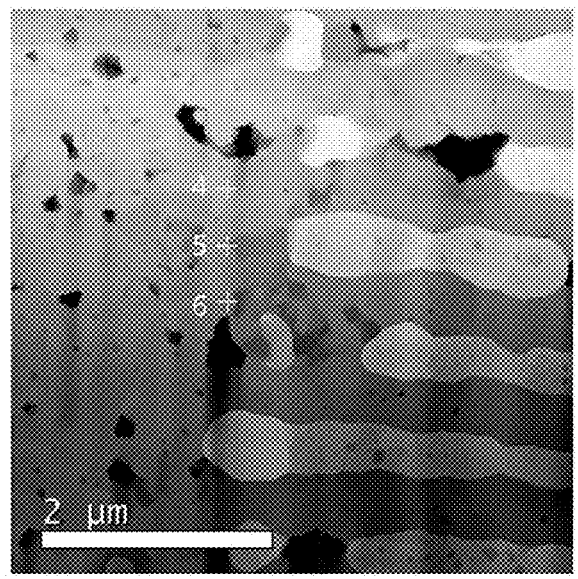
FIG. 8B is a TEM image of a corresponding sample region.

Referring to FIG. 8B, after the end of the internal electrode of the interfacial portion adjacent to the side margin portion was aligned with the vertical midline of the image, the Mo content of the side margin portion at points of measurement positions 4 to 6 (corresponding to 4, 5, and 6 of FIG. 8B) at equal intervals of 500 nm vertically in a region of 50 nm in an outward direction of the side margin portion from the end of the internal electrode was analyzed.

TABLE 1

| Measurement position | Mo in cover portion or side margin portion (at %) |
|---|---|
| 1 | 3.84 |
| 2 | 3.61 |
| 3 | 4.12 |
| 4 | 4.09 |
| 5 | 3.15 |
| 6 | 3.47 |
| Average | 3.71 |

Figure 9B:
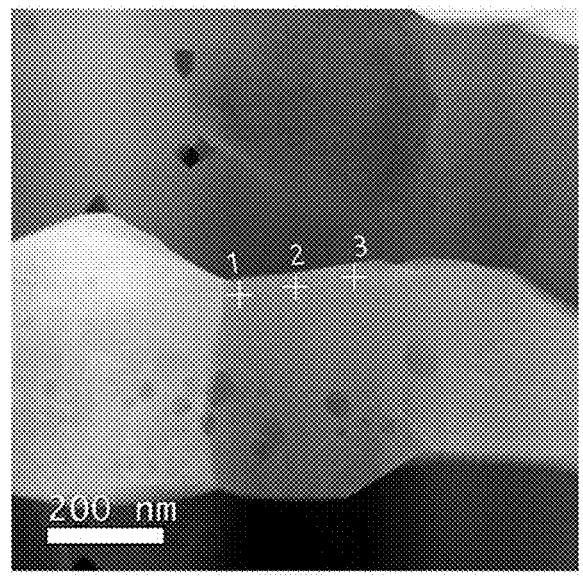
FIG. 9B is a TEM image of a corresponding sample region.

The measurement positions 1 to 3 are located in the cover portion. The value of the measurement position 1 indicates that the Mo content is 3.84 at % at the point corresponding to 1 of FIG. 7B, the value of the measurement position 2 corresponds to 2 in FIG. 7B, and the value of the measurement position 3 corresponds to 3 in FIG. 7B. The measurement positions 4 to 6 are located in the side margin portion. The value of the measurement position 4 indicates that the Mo content is 4.09 at % at the point corresponding to 4 of FIG. 8B, the value of the measurement position 5 corresponds to 5 in FIG. 8B, and the value of the measurement position 6 corresponds to 6 in FIG. 8B. Also, 3.71 at %, which is the average value of the Mo content at the measurement positions 1 to 6, is shown at the bottom. Next, the Mo (at %) content at the measurement positions 1 to 6 in the interfacial portion was analyzed. Referring to FIG. 9B, the Mo content of the outermost internal electrode of the interfacial portion at points of the measurement positions 1 to 3 (corresponding to 1, 2, and 3 of FIG. 9B) at equal intervals of 100 nm horizontally, in a region of 20 nm from the interface of the outermost internal electrode and the cover portion of the interfacial portion in an inward direction of the interfacial portion was analyzed.

Figure 10B:
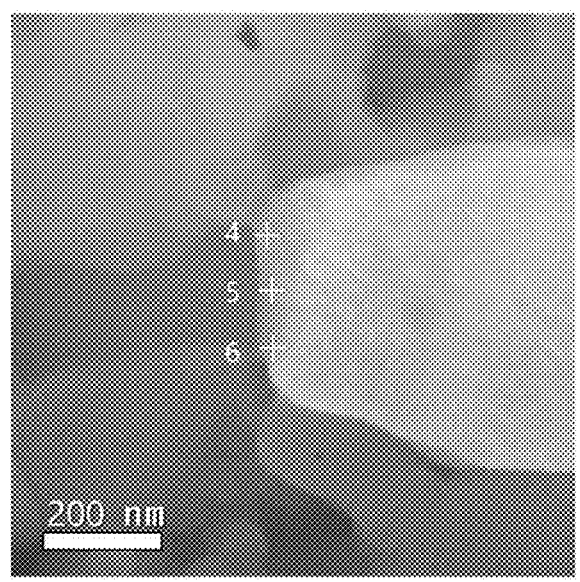
FIG. 10B is a TEM image of a corresponding sample region.

Referring to FIG. 10B, the Mo content at the end of the internal electrode of the interfacial portion at points of the measurement positions 4 to 6 (corresponding to 4, 5, and 6 of FIG. 10B) at equal intervals of 100 nm vertically, in a region of 20 nm from the interface of the side margin portion and the end of the internal electrode of the interfacial portion was analyzed.

TABLE 2

| Measurement position | Mo in interfacial portion (at %) |
|---|---|
| 1 | 0.47 |
| 2 | 0.63 |
| 3 | 0.52 |
| 4 | 0.67 |
| 5 | 0.43 |
| 6 | 0.61 |
| Average | 0.56 |

The measurement positions 1 to 3 are located in the outermost internal electrode of the interfacial portion. The value of the measurement position 1 indicates that the Mo content is 0.47 at % at the point corresponding to 1 of FIG. 9B, the value of the measurement position 2 corresponds to 2 in FIG. 9B, and the measurement position 3 corresponds to 3 in FIG. 9B. The measurement positions 4 to 6 are located at the end of the internal electrode of the interfacial portion. The value of the measurement position 4 indicates that the Mo content is 0.67 at % at the point corresponding to 4 of FIG. 10B, the value of the measurement position 5 corresponds to 5 in FIG. 10B, and the value of the measurement position 6 corresponds to 6 in FIG. 10B. Also, 0.56 at %, which is an average of the Mo content at the measurement positions 1 to 6, is shown at the bottom. The average Mo (at %) in the cover portion and the side margin portion and the average Mo (at %) in the interfacial portion for Experimental Example 4 measured by the method described above are shown in Table 3 below. In addition, an average Mo (at %) in the cover portion and the side margin portion and an average Mo (at %) in the interfacial portion for Experimental Examples 1 to 3, 5, and 6 were measured by the same method as that of Experimental Example 4 and are shown in Table 3 below.

The evaluation of moisture resistance reliability was conducted with the 8585 Test, and after 40 sample chips were prepared for each experimental example, a voltage of 1.2Vr was applied for 6 hours at a temperature of 85° C. and a relative humidity of 85%, and a sample chip whose insulation resistance was dropped to a value equal to or less than 1/100 of an initial insulation resistance, among the 40 sample chips, was evaluated as defective. In Experimental Examples 1 to 6, a case in which there were 4/40 or more defects was evaluated that the moisture resistance reliability by adding Mo was not improved.

TABLE 3

| Experimental example | Average Mo in cover portion and side margin portion (at %) | Average Mo in interfacial portion (at %) | Moisture resistance reliability |
|---|---|---|---|
| 1 | 0.03 | 0 | 5/40 |
| 2 | 0.14 | 0.052 | 3/40 |
| 3 | 1.43 | 0.27 | 2/40 |
| 4 | 3.71 | 0.56 | 1/40 |

TABLE 3-continued

| Experimental example | Average Mo in cover portion and side margin portion (at %) | Average Mo in interfacial portion (at %) | Moisture resistance reliability |
|---|---|---|---|
| 5 | 5.29 | 0.83 | 3/40 |
| 6 | 7.17 | 1.12 | 4/40 |

Through Experimental Examples 2 to 5, it can be seen that the moisture resistance reliability, such as corrosion resistance, was improved when the Mo content in the cover portion and the side margin portion was 0.1 at % or more and 5.5 at % or less and the Mo content in the interfacial portion was 0.05 at % or more and 1.0 at % or less. Meanwhile, through Experimental Example 1, it can be seen that the moisture resistance reliability such as corrosion resistance was not improved when the Mo content in the cover portion and the side margin portion was less than 0.1 at % and the Mo content in the interfacial portion was less than 0.05 at %. Also, through Experimental Example 6, it can be seen that, when the Mo content in the cover portion and the side margin portion exceeds 5.5 at % and the Mo content in the interfacial portion exceeds 1.0 at %, the difference between the Mo content of the cover portion and the side margin portion and the Mo content of the active portion is too large so that the difference between the sintering behavior of the cover portion and the side margin portion and the sintering behavior of the active portion excessively increases to cause mismatch of sintering behavior, and thus, the moisture resistance reliability was not improved.

As set forth above, one of the various effects of the present disclosure is to improve the reliability of the multilayer electronic component by controlling the Mo content for each part.

While example exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a side margin portion disposed on fifth and sixth surfaces; and
external electrodes disposed on the third and fourth surfaces,
wherein the body includes an active portion having internal electrodes alternately arranged with the dielectric layer interposed therebetween in the first direction and a cover portion disposed on both end surfaces of the active portion in the first direction,
the active portion, the cover portion, and the side margin portion include molybdenum (Mo), and
a Mo content in an interfacial portion, a region of the active portion, adjacent to one of the cover portion and the side margin portion, is higher than a Mo content in a central portion of the active portion.

2. The multilayer electronic component of claim 1, wherein a Mo content in the one of the cover portion and the side margin portion is higher than the Mo content in the interfacial portion.

3. The multilayer electronic component of claim 2, wherein the Mo content included in the one of the cover portion and the side margin portion is 0.1 at % or more and 5.5 at % or less, compared to the cover portions and side margin portions, respectively.

4. The multilayer electronic component of claim 1, wherein the central portion of the active portion does not include Mo.

5. The multilayer electronic component of claim 1, wherein the Mo content included in the interfacial portion is 0.05 at % or more and 1.0 at % or less.

6. The multilayer electronic component of claim 1, wherein a Mo content included in a region, spaced apart by 500 nm from the interfacial portion in an outward direction, of the one of the cover portion and the side margin portion is 0.1 at % or more and 5.5 at % or less.

7. The multilayer electronic component of claim 1, wherein a Mo content included in a region, spaced apart by 20 nm from the one of the cover portion and the side margin portion in an inward direction, of the interfacial portion is 0.05 at % or more and 1.0 at % or less.

8. The multilayer electronic component of claim 1, wherein
a Mo content included in a region, spaced apart by 500 nm from the interfacial portion in an outward direction, of the one of the cover portion and the side margin portion is 0.1 at % or more and 5.5 at % or less, and
a Mo content included in a region, spaced apart by 20 nm from the one of the cover portion and the side margin portion in an inward direction, of the interfacial portion is 0.05 at % or more and 1.0 at % or less.

9. The multilayer electronic component of claim 1, wherein an average thickness of one of the internal electrodes is 0.4 µm or less.

10. The multilayer electronic component of claim 1, wherein an average thickness of one of the plurality of dielectric layers is 0.4 µm or less.

11. The multilayer electronic component of claim 1, wherein an average width of the side margin portion is 20 µm or less.

12. The multilayer electronic component of claim 1, wherein an average thickness of the cover portion is 20 µm or less.

13. The multilayer electronic component of claim 1, wherein a Mo content in an interfacial portion, another region of the active portion, adjacent to another of the cover portion or the side margin portion, is higher than the Mo content in the central portion of the active portion.

14. A multilayer electronic component comprising:
a body including a plurality of dielectric layers and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a side margin portion disposed on fifth and sixth surfaces; and
external electrodes disposed on the third and fourth surfaces,
wherein the body includes an active portion having internal electrodes alternately arranged with the dielectric layer interposed therebetween in the first direction and a cover portion disposed on both end surfaces of the active portion in the first direction, and
in the active portion, a molybdenum (Mo) content decreases in an inward direction towards a center portion of the active portion.

15. The multilayer electronic component of claim 14, wherein the Mo content decreases from the side margin portion to the active portion.

16. The multilayer electronic component of claim 14, wherein the Mo content decreases from the cover portion to the active portion.

17. The multilayer electronic component of claim 14, wherein the Mo content included in one of the cover portion and the side margin portion is 0.1 at % or more and 5.5 at % or less.

18. The multilayer electronic component of claim 14, wherein a Mo content included in a region, spaced apart by 500 nm from the active region, of one of the cover portion and the side margin portion is 0.1 at % or more and 5.5 at % or less.

19. The multilayer electronic component of claim 14, wherein a Mo content included in a region, spaced apart by 20 nm from one of the cover portion and the side margin portion, of the active region is 0.05 at % or more and 1.0 at % or less.

20. A multilayer electronic component comprising:
a body including a plurality of dielectric layers and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
external electrodes disposed on the third and fourth surfaces,
wherein the body includes an active portion having internal electrodes alternately arranged with the dielectric layer interposed therebetween in the first direction and a cover portion disposed on both end surfaces of the active portion in the first direction, and
a molybdenum (Mo) content in the cover portion is greater than a Mo content in the active portion.

21. The multilayer electronic component of claim 20, wherein the Mo content in the cover portion is 0.1 at % or more and 5.5 at % or less.

22. The multilayer electronic component of claim 20, wherein a Mo content included in a region, spaced apart by 20 nm from the cover portion, of the active region is 0.05 at % or more and 1.0 at % or less.

* * * * *